United States Patent [19]

Maruyama

[11] 4,346,946
[45] Aug. 31, 1982

[54] ROTARY DEVICE

[75] Inventor: Teruo Maruyama, Neyagawa, Japan

[73] Assignee: Matsushita Electric Industrial Co., Ltd., Osaka, Japan

[21] Appl. No.: 171,375

[22] Filed: Jul. 23, 1980

[30] Foreign Application Priority Data

Jul. 26, 1979 [JP] Japan .................................. 54-95366

[51] Int. Cl.³ ............................................. F16C 32/06
[52] U.S. Cl. ....................................... 308/9; 308/160; 308/172
[58] Field of Search ................... 308/9, 139, 140, 141, 308/159, 160, 163, 168, 170, 172, DIG. 1

[56] References Cited

U.S. PATENT DOCUMENTS

| 2,756,115 | 7/1956 | Michel ................................ 308/172 |
| 2,941,850 | 6/1960 | Warner ............................... 308/160 |
| 3,115,372 | 12/1963 | Bard .................................... 308/170 |
| 3,376,083 | 4/1968 | Muijderman ...................... 308/172 |
| 3,497,273 | 2/1970 | Muijderman et al. .............. 308/172 |
| 3,891,282 | 6/1975 | Tuffias ................................ 308/160 |
| 3,913,989 | 10/1975 | Williams ............................ 308/9 |
| 3,951,573 | 4/1976 | Dunning et al. ................... 308/160 |
| 4,167,295 | 9/1979 | Glaser ................................ 308/9 |

FOREIGN PATENT DOCUMENTS

2747400  4/1979  Fed. Rep. of Germany ...... 308/160

Primary Examiner—Richard R. Stearns
Attorney, Agent, or Firm—Burgess, Ryan and Wayne

[57]  ABSTRACT

The present invention relates to a hydraulic bearing construction for carrying thrust loads and provides a hydraulic bearing construction in which for instance, a pivot bearing having a small contact area is combined with two thrust bearings which have widely different load carrying characteristics (axial stiffness or rigidity) so that wear of bearing surfaces caused by starting and stopping will not adversely affect the positional accuracy of an equipment, the equipment can be started at low torque and position errors are minimized.

4 Claims, 18 Drawing Figures

ROTARY DEVICE

SUMMARY OF THE INVENTION

The present invention has for its object to provide a hydraulic bearing construction which has the following features and effects.

(1) trouble due to wear of bearing surfaces resulting from long periods of operation can be avoided.

(2) Rotation can be started at a low torque.

(3) Deviation in the position, in the axial direction of a rotating member due to the changes in position of the equipment can be reduced to a low level.

The present invention provides a rotary device in which two thrust bearings, which are widely different in space vs. load carrying capacity (axial stiffness or rigidity) characteristics, are formed in both surfaces of a flange and a pivot spherical bearing which has a small contact area is provided on the side of the thrust bearing having a lower stiffness or rigidity. The invention provides so that there can accrue various advantages and features such that wear of bearing surfaces due to starting and stopping of rotation will not adversely affect the positional accuracy of the equipment even after a long period of operation. Rotation can be started with low torque and deviation in the axial direction of a rotating member due to the changes in position of the equipment can be reduced to a minimum level.

In a rotary device supported by a hydraulic bearing in accordance with the present invention, there are provided a thrust bearing which has very sensitive space vs. load carrying capacity characteristics, an axial direction control means which imparts a force in the direction in which the space between the relatively moving surfaces of said thrust bearing is reduced and which has a small stiffness or rigidity and a projection extended from a surface in opposed relationship with said thrust bearing or the surface of a housing, whereby there can be provided such various advantages and features that the rotation can be started by low torque, that troubles caused by wear of bearing surfaces can be eliminated and that the positional errors can be reduced to a minimum level.

Even when the present invention is applied to dynamic pneumatic bearings using air as the lubricant, satisfactory effects can be attained. As a result, wear of thrust bearing surfaces which has long been a problem in the prior art can be eliminated. The present invention can be effectively used in various equipment, devices and apparatus which use hydraulic bearings.

The present invention has a high industrial value as a fundamental construction of bearings for rotary devices which are supported by hydraulically-lubricated bearings and which require position control in the thrust direction with a high degree of accuracy for long time interval.

For instance, various applications and developments can be made in acoustic or sound equipment such as video discs, tape recorders, players and the like, industrial equipment such as sheet discs, magnetic discs, and the like or rotating mirrors in laser printers.

BACKGROUND OF THE INVENTION

In order to control axial position, a bearing construction using a radial hydraulic bearing has long been used. This bearing construction as shown in FIG. 1 has the following advantages.

(1) Because of the weight of housing 303, its upper end surface is normally kept in contact with a pivot bearing 302 at the free end of a stationary shaft 301 securely joined to a base 300. Because of the point contact of the pivot bearing 302, the rotational load is low so that rotation can be started by a low torque.

(2) The axial position control can be accomplished by the simple construction. For instance, when combined with a radial hydraulic bearing 305, a high precision rotary function can be obtained.

Figure 1:
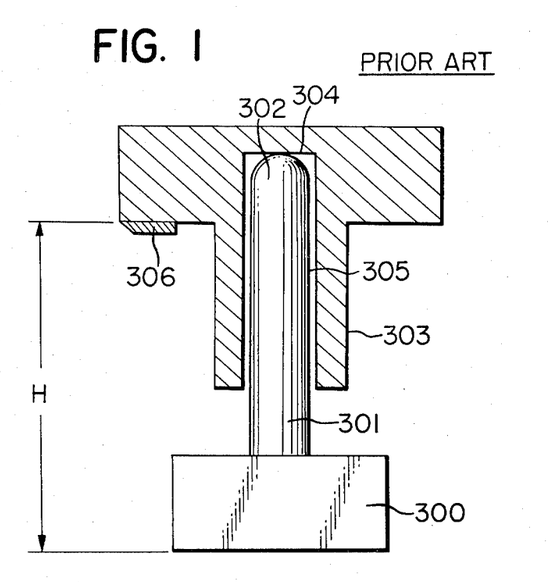
FIG. 1 is a longitudinal cross sectional view of a prior art supporting construction using a pivot bearing.

However, the evaluation of applications of the pivot bearing construction as shown in FIG. 1 to commercial VTR cylinders, which have recently been attaining an increasingly higher degree of precision, shows the following problems.

After the long continuous operation of the equipment, the top of the pivot bearing 302, which is a mechanical contact part, is gradually worn out. In the case of VTR cylinders, the wear of the top results in the lowering of the position of a head (H in FIG. 1) on the rotary cylinder and consequently the relative position between the tape and the head changes. The allowable tolerance of the relative position change has increasingly become smaller because of the high density recording and the demand for portability. For instance, in the case of an embodiment, δ must be less than three microns.

One of the countermeasures is a combination of lubricants having excellent boundary lubricability with materials of the pivot bearing 302 and its contact surface having high resistance to wear, for instance, ceramic, superalloys, jewels, etc. However, over a long period of continuous operation, the above-described method still has many problems from the stand-point of cost of mass production when the degree of wear must be held within an allowable tolerance which can satisfy specifications of VTR cylinders which require higher degrees of precision.

Another countermeasure is to provide a conical groove in the surface of the upper end surface 304 in opposed relation with the top of the pivot bearing 302 so that instead of a point contact, a line contact is obtained and the bearing surface pressure on the bearing surface can be reduced. However, in this case, from the stand-point of machining and assembly of parts, it has been difficult to attain the alignment between the axis of the stationary shaft 301 and the axis of the housing 303.

Pivot bearings of the type comprising a cylindrical shaft and a rolling-contact bearing have been widely used. However, in addition to the problems associated with the above-described conical groove, there arises the problem that the overall construction of the equipment becomes very complex.

Figure 2:
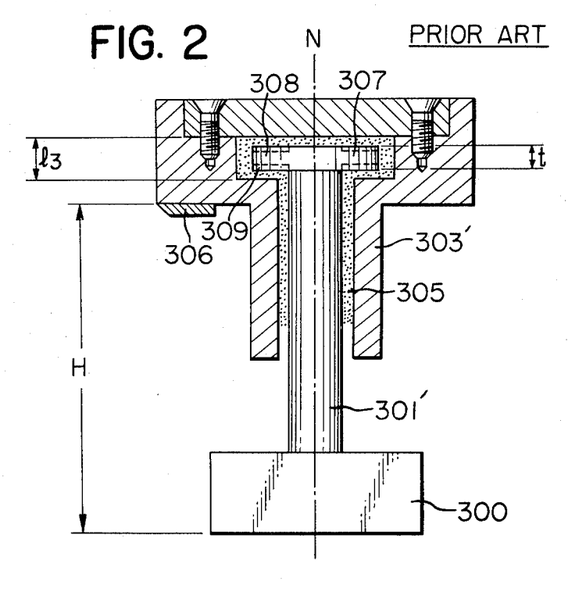
FIG. 2 is a prior art longitudinal sectional view of a bearing construction in which a rotating member is supported by the pressure produced on both sides of the flange of a thrust bearing.

As shown in FIG. 2. There is known a hydraulic bearing construction of the type in which, the relatively moving surfaces are maintained in noncontact during rotation, in this construction grooves 308 and 309 are formed in both surfaces of a flange 307 of a thrust hydraulic bearing so that the housing 303' can be supported in a neutral state by oil film pressures produced at both the surfaces. When the above-mentioned hydraulic bearing is applied to VTR cylinders, a fundamental construction as shown in FIG. 2 will be obtained. During rotation, the position in the thrust direction of a head 306 is determined from the balance between the oil film pressures produced in grooves 308 and 309 formed in the upper and lower surfaces of the flange 307 and the weight of the housing 303'. For instance, when the temperature changes, the viscosity of the lubricant changes so that the oil film pressure changes. As a result, the position of the head 306 in the thrust direction H changes.

In addition, when a space having a diameter large enough to house the flange 307 is formed within the housing 303', it is required to machine or fabricate parts with a higher degree of accuracy. For instance, the upper and lower surfaces of the flange 307 must be so machined that a higher degree of verticalness or verticality can be obtained with respect to the axis N. Furthermore, the depth $l_3$ of the enlarged-diameter portion in which is disposed the flange and the thickness t of the flange 307 must be machined with a high degree of accuracy.

In addition, when the hydraulic bearing construction as shown in FIG. 2 is applied to portable type VTR cylinders which have recently required a higher and higher in the degree of precision, the following problems arise.

In the case of the portable VTR, a VTR set is used in various positions. It is used not only in the vertical position as shown in FIG. 2 but also in the horizontal position. In the vertical position, the axial position (H in FIG. 2) of the head 306 mounted on the housing 303' which corresponds to an upper cylinder to be described below is dependent upon the balance between three forces; that is, the total bearing pressures at two places by the grooves 308 and 309 formed in the upper and lower surfaces of the flange 307 and the weight of the housing 303'. However, when the position of the equipment changes, the component in the axial direction of the weight of the housing 303 changes, so that the axial position H of the head also changes. As a result, when the hydraulic bearing construction as shown in FIG. 2 is applied to a portable VTR cylinder, the above-described position error in the axial direction of the head position becomes a serious defect. In order to make the VTR cylinders more compact in size and to attain a higher degree of recording density, the VTR cylinder must be made with a higher and higher degree of precision. For instance, in the case of an embodiment, there has been a demand for maintaining the positional difference in the axial direction of the head position within two microns.

The inventor has proposed a bearing construction (not shown) of the type in which two thrust bearings whose load carrying characteristics and spaces are widely different from each other are formed and a projection of a small diameter is formed on a relatively moving surface of one bearing, whereby the rotation can be started by a low torque and the troubles due to friction can be eliminated. In the above-described bearing construction, the relatively moving surface of the above-described projection rotates while maintaining a very thin oil film so that during rotation, in contrast to the pivot bearing, no metal contact exists and consequently wear of the bearing surfaces is very low even after long use.

However, when the equipment is at rest, no dynamic pressure effects of the bearing can be obtained, so that there is a possibility that metal contact occurs. Especially when the above-described bearing construction is applied to equipment which is started and stopped at a high degree of frequency, wear of bearing relatively moving surfaces occurs during starting and stopping.

DESCRIPTION OF THE EMBODIMENTS

Figure 3:
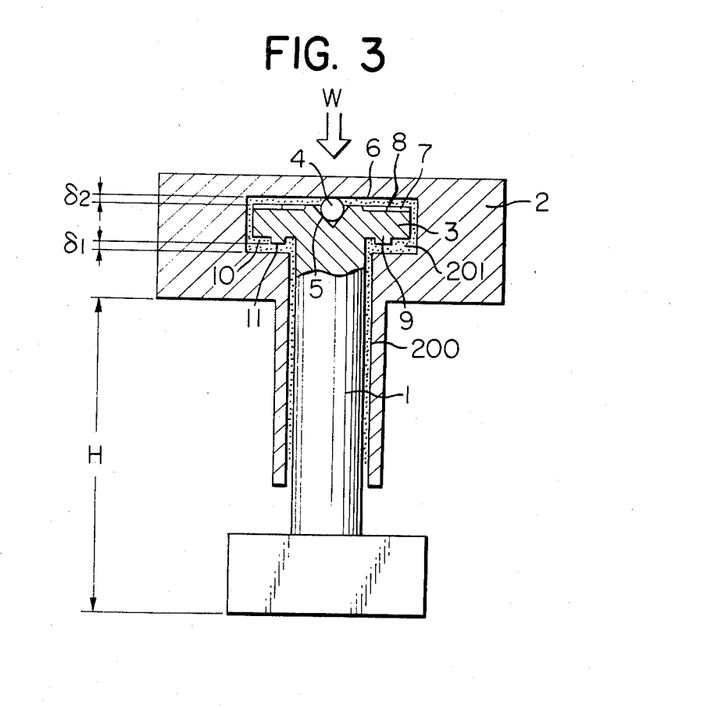
FIG. 3 is an axial sectional view of a bearing construction showing the underlying principle of the present invention.

FIG. 3 shows the fundamental construction of a device showing the underlying principle of the present invention. The device is at rest.

Numeral 1 is a stationary shaft; 2, a housing which corresponds to an upper cylinder of a VTR cylinder which is an embodiment to be described below and which is rotatably fitted over the stationary shaft 1 and is a rotating member of the equipment; 3, a flange of a thrust bearing; 4, a pivot bearing located in a V groove 5 at the center of the upper end of the stationary shaft 1; 6, an end surface of the housing; 7, a herringbone bearing, i.e. a first dynamic pressure thrust bearing, which is formed in the upper surface 8 of the flange 3 of the thrust bearing and is an axial direction control means; 9, a ring-shaped projection formed on the lower surface 10 of the flange 3; 11, a step bearing which is a second thrust bearing formed on the surface of the ring-shaped projection 9; and 200, a radial bearing formed between the stationary shaft 1 and the housing 2.

The herringbone bearing 7 is of a conventional type in which a groove pattern is formed such that a lubricating fluid is forced to flow in both the centrifugal and central direction. The step bearing 11 has no action of forcing the liquid in the central and centrifugal directions of the shaft and grooves are formed radially. A lubricating oil completely fills the space between the shaft 1 and the housing 2.

Figure 4A:
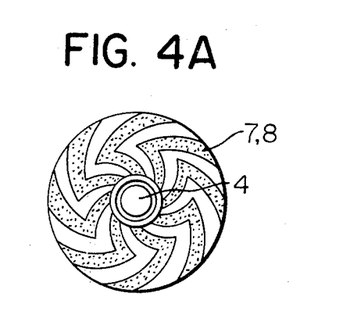
FIGS. 4A and 4B are enlarged views of thrust bearing portions of FIG. 3.
Figure 4B:
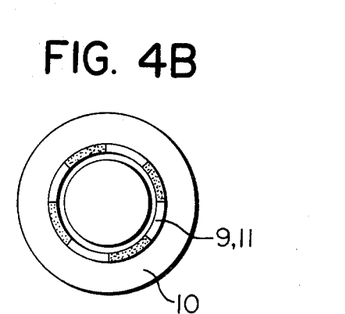

FIG. 4A shows the herringbone bearing formed in the surface of the flange 3 of the thrust bearing and FIG. 4B shows the step bearing 11. In all figures of the accompanying drawings, dark areas show grooves or recesses and the other areas, ridges or projections.

When the equipment is in the vertical position and at rest as shown in FIG. 3, no oil film pressure is produced by the bearings 7 and 11 so that the housing 2 which is the rotating member decends by its own weight and consequently its end surface 6 is in point contact with the top surface of the pivot bearing.

Figure 5:
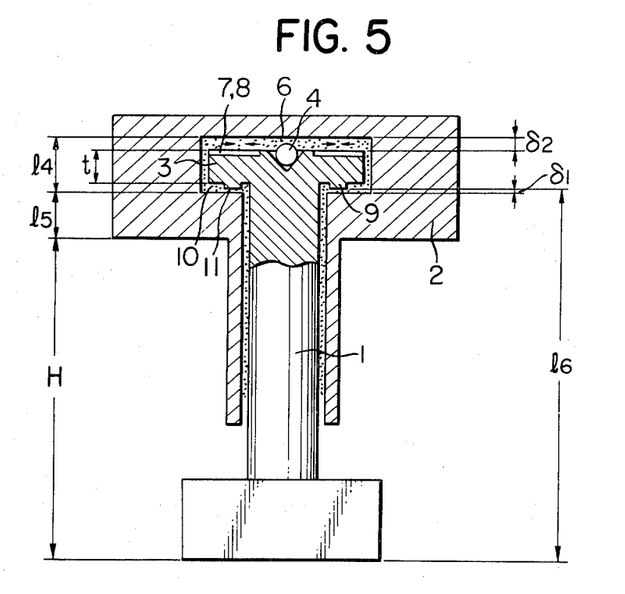
FIG. 5 is an axial sectional view of the bearing construction shown in FIG. 3 when the rotating member is rotating.

FIG. 5 shows the equipment which is rotating.

During rotation, due to the relative rotation between the housing 2 and the flange surface which is stationary, oil film pressures are produced at the bearing surfaces 7 and 11. The herringbone bearing 7 has the function of forcing the lubricating fluid 201 to flow in the directions indicated by the arrows. Because of its pumping action and wedging action, high pressures can be produced even when a relatively large space $\delta_2$ exists. Unlike the spiral-groove bearings, the step bearing formed in the lower surface 10 of the flange 3 has no pumping action. However, because of the circumferential space variations, a positive load is obtained.

Figure 6A:
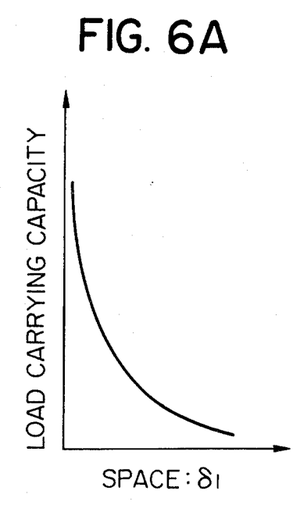
FIGS. 6A and 6B show the space vs. load carrying capacity characteristic curves, respectively.
Figure 6B:
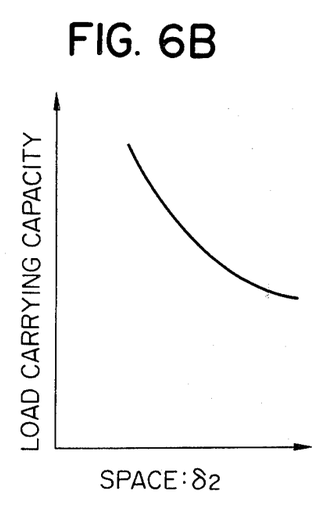

For the sake of comparison, the space-load carrying capacity characteristic curves of the herringbone bearing 7 and step bearing 11 are shown in FIGS. 6A and 6B. FIG. 6A shows the characteristic of the step bearing 11. The surface of the step bearing 11 formed on the surface of the ring-shaped projection 9 has a small effective bearing surface and the step bearing has no pumping action like the spiral-groove bearings. As a result, a high load carrying capacity can be attained only when the space $\delta_1$ is small. Therefore, as shown in FIG. 6A, a characteristic which is very sensitive to the space $\delta$, can be obtained. FIG. 6B shows the characteristic curve of the herringbone bearing 7. The outer diameter of the bearing is large and the effective area is greater. As a result, even when the space $\delta_2$ is large, a sufficiently high pressure can be produced. Therefore, as shown by the load carrying capacity curve in FIG. 6B, it is very insensitive to the space at the position of equilibrium when the space is $\delta_2$ not large and stiffness or rigidity is low.

In this equipment, the absolute height H (See FIG. 5) of the housing 2, which is the rotating member, during rotation is dependent upon the balance of three forces; that is, the total pressure of the herringbone bearing 7, the total pressure of the step bearing 11 and the axial component of the weight W of the housing 2.

During rotation, a high total pressure is produced by the herringbone bearing 7 so that the space $\delta_2$ between the herringbone bearing 7 and the end surface 6 of the housing 2 is considerably increased as compared with when the equipment is at rest. On the other hand when the space $\delta_1$ of the surface of the step bearing 11 becomes small, the condition for equilibrium between the forces can be attained.

The effects of the present invention can be summarized as follows.

(1) The equipment can be started and rotated with low torque. In addition, wear of the sliding part of the pivot bearing will not adversely affect the axial position H of the rotating member. When the housing 2, which is the rotating member of the equipment, is at rest in the vertical position, it is supported in point contact by the pivot bearing 4, so that it can be started by an extremely low torque.

During rotation the upper and lower bearings 7 and 11 of the flange 3 can be maintained in a contactless state. As a result, unlike the pivot supporting construction as shown in FIG. 1, there will not occur a change of the absolute height H of the rotating member due to wear.

For instance, even when the top surface of the pivot bearing or its opposing surface (the end surface 6 of the housing) is more or less plastically deformed due to impacts applied to the equipment so that the size $\delta_2$ (See FIG. 3), when the equipment is at rest changes, the equilibrium positions $\delta_1$ and $\delta_2$ are determined only by the pressures produced by the thrust bearings 7 and 11 and the axial component of the weight of housing 2 during rotation so that the height H of the housing 2 is not affected.

Even when the equipment is in the inverted position, it can be started at a low torque. In the inverted position, because of the weight W of the housing 2, the surface of the step bearing 11 is in contact with its opposing surface. However, as shown, the step surface can be formed on the surface of the ring-shaped projection 11 which has a small effective area so that the contact area is small.

Therefore, rotation can be started by a sufficiently low torque as compared with the case in which the thrust bearing surface as shown in FIG. 2 is in intimate contact with its opposing surface. In summary, the equipment has the features of both the pivot supporting construction as shown in FIG. 1 and the thrust bearing support construction as shown in FIG. 2 and can eliminate the defects thereof. In addition, it has a novel feature that the equipment can be started at a low torque even in the inverted position.

(2) The absolute axial height H of the rotating member 2 can be controlled with a high degree of accuracy.

One of the features of the equipment resides in the fact that the bearing (for instance, the step bearing 11) which is very sensitive to "displacement-load carrying capacity characteristic" is combined with the bearing (for instance, the herringbone bearing 7) which is insensitive to "displacement-load carrying capacity characteritic" at the position at which the space is large and which has a sufficiently high load carrying capacity at a position at which the space is large.

For instance, when the environmental temperature changes, viscosity of lubricants changes. In the equipment the deviation of the equilibrium position due to variations in viscosity can be reduced.

The step bearing 11 which is in the form of a ring can produce a high pressure only when the space $\delta_1$ is small. For instance when the housing 2 is positioned a small distance from the equilibrium point so that the space $\delta_1$ is increased, the pressure produced on the surface of the step bearing 11 is drastically decreased so that it acts as if the step bearing 11 did not exist. As a result, the housing 2 is brought back to the equilibrium point again.

On the other hand when the space $\delta_1$ is decreased, the pressure of the step bearing 11 drastically increases so that the housing is brought back to the equilibrium point.

Therefore, even when the viscosity changes more for less the variation in the space $\delta_1$ of the step bearing is very small, so that the variation in absolute height H of the housing 2 is very small. In addition, the equipment of the present invention can have a bearing construction which can minimize position errors.

For instance, when the present invention is applied to portable VTRs, the cylinder can be used regardless of its horizontal or vertical position. In the case of the equipment of the present invention, the deviation of the head position H due to the changes in position of the equipment can be reduced.

Figure 7:
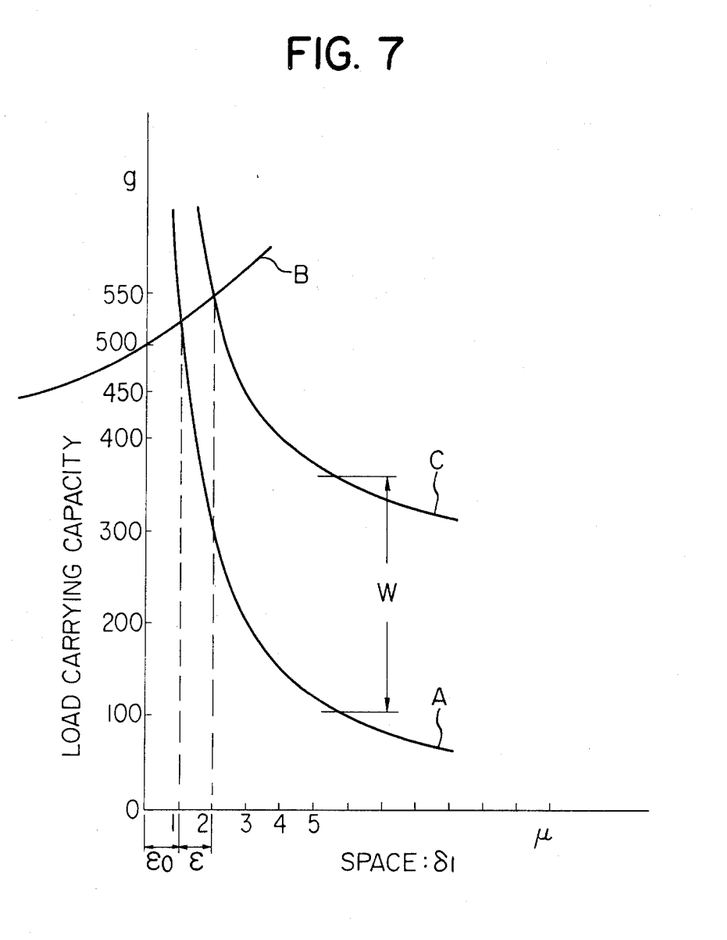
FIG. 7 shows the relation between the space between the lower bearing surface and the housing and the load carrying capacity of the herring bone and step bearings.

FIG. 7 shows a graph used for the explanation of the reason. The curve A is the space-load carrying capacity characteristic curve of the step bearing 11 in the horizontal position. The curve B shows the force needed to balance with the step bearing in the horizontal position and the characteristic of the herringbone bearing 7.

The slopes of the curves A and B are opposite because the curve B is plotted against the space $\delta_1$. The curve C shows the characteristic of the step bearing 11 when the equipment is in the vertical position. Since the weight of the equipment is added, the curve A is displaced by the weight W in parallel in the direction of the Y-axis.

In FIG. 7, the equipment is in equilibrium with the herringbone bearing the stiffness of which is small at the position at which the characteristic curve of the step bearing 11 is sensitive, that is the stiffness of the step bearing 11 is large, in either the horizontal or vertical position. Therefore, the deviation $\epsilon$ of the space $\delta_1$ of the step bearing 11 can be made extremely small. In an embodiment in which the present invention is applied to a portable cylinder of a VTR set, a double spiral 7 hearingbone bearing is so designed and constructed that when the weight W of the rotating member 2 is 250 grams, the load carrying capacity F is 300 grams when the space $\delta_2$ is 30 microns.

The step bearing 11 is so designed and constructed that it can balance with the above-described F which is equal to 550 grams when $\delta_1 (=\epsilon_o+\epsilon)$ is equal to 2 microns. In the vertical position, the space $\delta_1 (=\epsilon_o)$ is equal to 1 micron so that the error $\Delta(=2-1)$ is equal to 1 micron.

(3) As compared with the prior art construction having the flange 307, the construction of the thrust bearing in accordance with the present invention is such that machining tolerances are easy. The reason is as follows. The absolute height H of the housing 2 which is the rotating member and its rotating H is determined substantially by the height of the surface of the step bearing 11 of the flange 9 of the stationary shaft 1. As described elsewhere, the space $\delta_1$ is sufficiently small even when changes in position and viscosity occur. As a result, the height H of the housing 2 is almost not affected by the depth $l_4$ of the space in which the flange is disposed. For instance as shown in FIG. 5, in the case of a VTR cylinder in which a head is disposed at a height H, the head height H during rotation is determined only by the height $l_6$ of the surface of the step bearing 11 and the distance $l_5$ between the surface of the housing 2 in opposed relation with the step bearing 11 and the head. Therefore, the following relation is held:

$$H=l_6-l_5$$

In the case of, for instance, a VTR cylinder, the axial position H of the head during rotation can be positively determined merely by securing the accuracy of $l_6$ and $l_5$. Because of the reasons described above, machining of bearing parts becomes simple.

(4) Even when air is used as a lubricant, troubles due to wear of bearing surfaces can be minimized.

Dynamic pneumatic bearings have a problem that wear of bearing surfaces occurs when they are started and stopped. When the bearing surfaces are damaged by friction, particulate material is produced, thereby increasing the coefficient of friction. In addition, seizures result. Therefore, in the design and construction of dynamic pneumatic bearings, the most important problem is the selection of materials for sliding surfaces. For instance, when chrome oxide or alumina is used postulate material caused by, wear can be minimized and the coefficient of friction can be reduced, but a few thousand starts and stops is a limit.

When a superalloy is used, the application of etching technique to the machining of grooves of special bearings such as spiral-groove bearings is difficult so that supersonic machining must be employed. As a result, there arise many problems in the case of mass production. The present invention can be extremely effectively applied to dynamic pneumatic bearings.

When the equipment shown in FIG. 3 is applied to, for instance, a rotating mirror in a laser printer, the rotating member is supported at rest only by a point contact between the pivot bearing 4 and the end surface of the housing 2. Therefore, when the rotating member is started under this condition, no direct contact between the surface of the bearing 7 and its relatively moving surface will occur. When the housing 2 floats, the surfaces of the herringbone and step bearings 7 and 11, which are the upper and lower thrust bearings, can be maintained completely in contactless state by the dynamic pressure effect of the air film. As a result as with the case of using a lubricating liquid, the axial position H can be obtained with a higher degree of accuracy. In the equipment in accordance with the present invention, wear of the surfaces of the bearings 7 and 11 will not occur, so that bearing materials can be selected from a wide range of materials based upon the easeness of machining.

In the above embodiment, the step bearing 11 (See FIG. 4B) is used as the second thrust bearing which can attain a high load carrying capacity only when the space is small while the herringbone bearing (See FIG. 4A) is used as the pivot-side thrust bearing which can attain a high load carrying capacity even when the space is large.

Figure 8A:
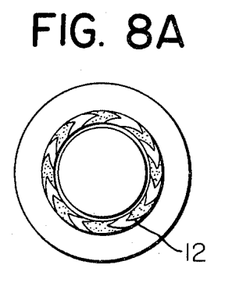
FIGS. 8A and 8B are views used for the explanation of some embodiments of bearings having low load carrying characteristics.
Figure 8B:
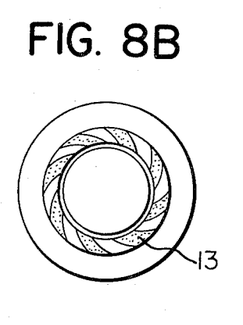

In addition to these bearings, the present invention can use other bearings. FIGS. 8A and 8B show some embodiments. FIG. 8A shows a herringbone bearing 12 formed on the surface of the ring-shaped projection 9. FIG. 8B shows a conventional spiral-groove 13 which forces a lubricant to flow only inwardly of the flange 9. Either of them can be used instead of the step bearing shown in FIG. 4B. When the space is same, the load carrying capacity is high as compared with the step bearing.

The first thrust bearing in the pivot-side is not required to be a herringbone bearing. For instance, a spiral groove bearing which forces a lubricant only toward the axis or center of a shaft can be used. In any case, it suffices that a groove pattern is such that the spaces varies in the circumferential direction and that the upper and lower bearings are widely different in the displacement vs. load carrying capacity characteristic. The grooves can be formed in the surface of the housing 2 in opposed relationship with the flange 3.

Referring back to FIG. 3, in addition to the advantage attained by the ring-shaped projection 9 with the step bearing 11 in that the equipment can be started by a low torque in the inverted position, the following advantages can be attained.

There always exists a possibility that the space between the surface of the flange and its relatively moving surface varies in the circumferential direction because of machining errors of the surface of the flange of the thrust bearing and its opposing surface. In this case, regardless of the fact whether the grooves are formed in the surface of the flange or not, the thrust bearing produces unexpected pressures due to the wedge-shaped film. The smaller the space, the higher the pressure becomes. The ring-shaped projection 11 has an effect of preventing the load carrying capacity from becoming higher than a desired level due to machining errors. The reason is that the smaller the ring width, the lower the pressure becomes due to the lateral leakage effect of a lubricant between the bearing surfaces which are moving relative to each other, the effect being caused by the variations in space in the circumferential direction. As a result, when the diameter of the flange 3 is sufficiently small, the projection can be eliminated and the grooves can be directly formed in the surface of the flange. In this case, in order to make the space-load carrying capacity characteristic curve very sensitive as indicated by the curve A in FIG. 7, for instance, the grooves can be made to have a sufficiently deep depth.

Figure 9:
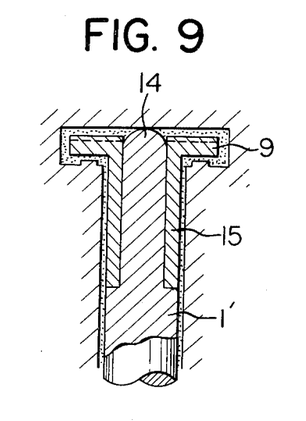
FIGS. 9 through 11 are fragmentary sectional views of further embodiments of the present invention.
Figure 10:
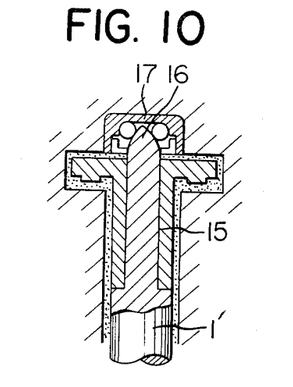

In the embodiment shown in FIG. 3, the ball 4 is used as the pivot bearing, but as shown in FIG. 9, a pivot bearing 14 can be used which has a spherical top end. In this case, it is preferable that a sleeve 15 integral with a flange 9 of a thrust bearing is mounted. FIG. 10 shows a case in which a conical upper end 16 of the stationary shaft is supported by a unitized ball bearing 17. In this case, the conical surface 16 is made into contact with the balls at many points, but because of the point contact, the starting torque is sufficiently low. During the rotation, the conical surface 16 is completely separated from the ball bearing 17 so that the above-described misalignment between the stationary shaft 1 and the ball bearing 17 will not present any problem at all.

Figure 11:
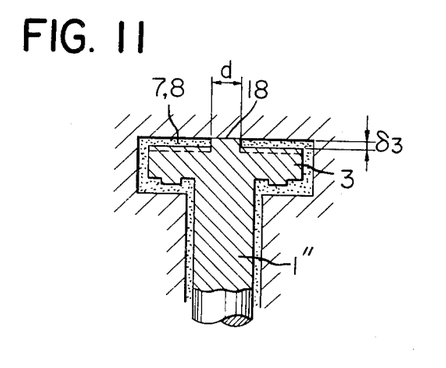

FIG. 11 shows an example in which, instead of using a ball as a pivot bearing, a projection 18 of a small diameter is extended from the center of the flange 3, so that a rotating member can be started by a low torque. In the case of the construction shown in FIG. 11, the contact is the surface contact, but the projection is small in diameter and extended at the center at which the relative speed in the circumferential direction is low, so that the rotating member can be started by a sufficiently low torque. As compared with the construction as shown in FIG. 3 in which the ball is disposed in the V groove 5, the control of the precision of the degree of projection of the projection 18 becomes simpler. In the case of the embodiment of a VTR cylinder, the rotating member can be started by a sufficiently low torque with the projection 18 having the outer diameter d of 3 mm and the projection $\delta_3$ of 20 microns.

So far the bearing construction in which a sleeve is fitted over a shaft one end of which is securely joined to a base has been described.

Figure 12A:
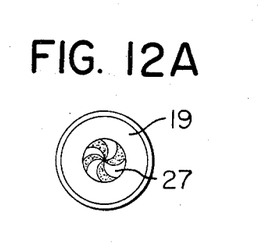
FIG. 12A is a view used for the explanation of the end of a rotating shaft with both ends supported by the bearings in accordance with the present invention.

The present invention can be, of course, applied to a bearing construction in which a rotating shaft is fitted into a sleeve. Alternatively, as shown in FIGS. 12A and 12B, the present invention can also be applied to a bearing construction in which both ends of a rotating shaft are supported by thrust bearings.

Figure 12B:
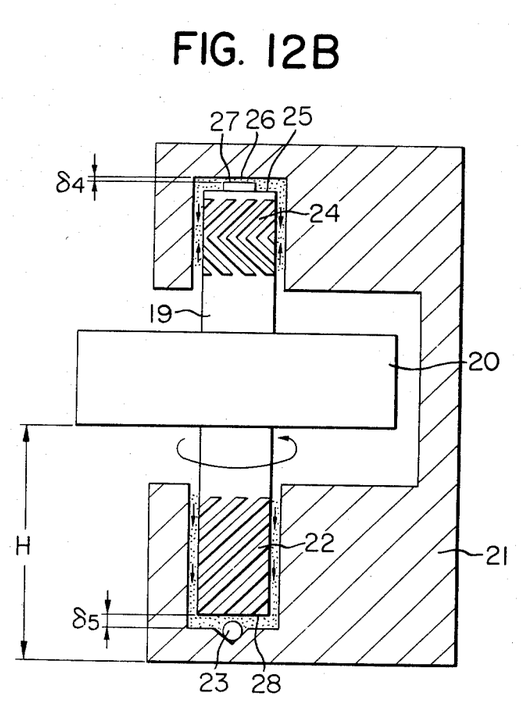
FIG. 12B is a sectional view of a bearing construction in accordance with the present invention in which the rotating shaft with the top end as shown in FIG. 12A is supported at both ends.

In FIG. 12B, numeral 19 is a rotating shaft; 20, a flywheel; 21, a housing which receives both the ends of the rotating shaft; 22, a thrust bearing which is a first thrust bearing; 23, a pivot bearing; 24, a radial spiral-groove bearing; 25, the upper end face of the rotating shaft 19; 26, a projection extended at the center of the upper end face 25; and 27, a micro-groove bearing, i.e. a second thrust bearing, which is formed in the upper end face of the projection 26 and has a relatively small diameter in relation to the diameter of shaft 19. The thrust bearing 22 has a double function of supporting both radial and thrust loads. It can attain sufficiently high load carrying capacities even when the space $\delta_5$ is small. It corresponds to the herringbone bearing 7 shown in FIG. 4A.

On the other hand, the micro-groove bearing 27 can attain a high load carrying capacity only when the space is small and corresponds to the step bearing 11 which has a sensitive space-load-carrying capacity characteristic. In embodiment shown in FIG. 12B, when the equipment is at rest (not shown), because of the weight of the flywheel 20, the lower end face 28 of the rotating shaft 19 is in contact with the pivot bearing 23, but during rotation, the lower end face 28 is spaced apart from the pivot bearing 23 by a greater distance. Meanwhile, the relatively moving surface of the micro-groove bearing 27 maintains a very small space $\delta_4$.

Therefore, for instance, in the case of a VTR cylinder in which a head is mounted on the flywheel 20, the absolute head height H is substantially unaffected by the changes in position of the equipment.

In the equipment according to the present invention, the micro-groove bearing 27 is formed in the end face of the projection 26 (See FIG. 12A), but when the rotating shaft 19 has a small diameter, the micro-groove bearing 27 can be directly formed in the flat end face of the rotating shaft without extending the projection 26. Alternatively, the micro-groove bearing 27 can be formed in the bottom of a recess in opposed relationship with the projection 26 or the upper end face 25 of the rotating shaft 19.

Figure 13:
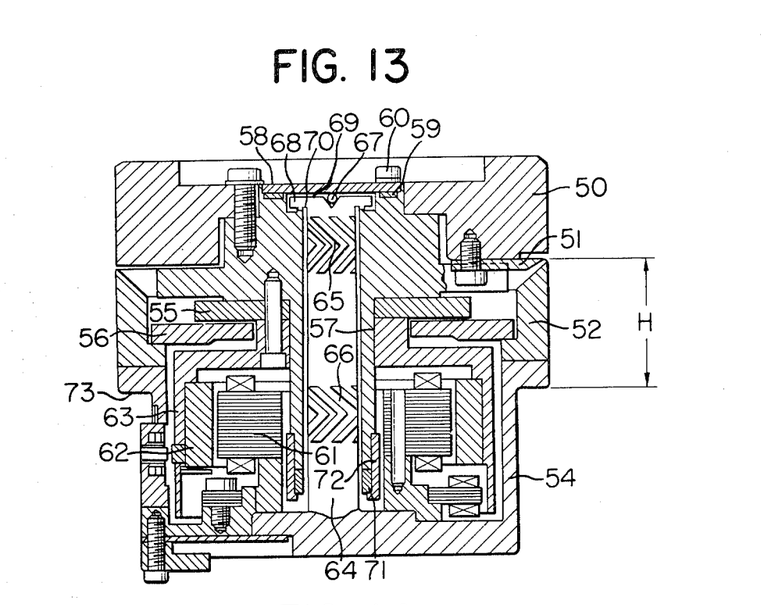
FIGS. 13 and 14 are front sections of VTR cylinders to which are applied the present invention.

Next an embodiment in which the present invention is applied to a VTR cylinder will be described. FIG. 13 shows a cylinder in which a shaft is stationary and a magnetic liquid is used as a lubricant. Numeral 50 is an upper cylinder which is a rotary head member; 51, a head mounted on the upper cylinder 50; 52, a lower cylinder which is securely joined to a lower housing 54 which is a base; 55 and 56, rotating and stationary members of a rotary transformer for transmitting the signal from the rotating side to the stationary side; 57, a rotating sleeve on which is mounted the upper cylinder 50 in such a way that the latter can be upwardly removed; 58, an upper cap which is securely joined with bolts 60 to the upper end surface of the rotating sleeve 57 through an oil seal 59 for preventing the leakage of a lubricant; 61, 62 and 63, a stator, a rotor magnet and a magnet housing or case 63 of a direct-drive motor which imparts the rotary driving force to the rotating member of the equipment of the present invention; 50, 57, 55, 63 and 62 constituting the major rotating member of the equipment in accordance with the present invention. A center shaft 64 securely fixed to the lower housing 54 is formed with spiral grooves 65 and 66 which are spaced apart vertically and belong to the non-circular bearings. Numeral 67 is a pivot bearing at the upper end of the center shaft 64; 68, a flange of a thrust bearing; 69, a herringbone bearing formed in the upper surface of the flange 68; and 70, a step bearing (not shown in detail) formed in the lower surface of the flange 68.

A magnetic liquid which is used as a lubricant completely fills the space between the center shaft 64 and the rotating sleeve 57 and a magnetic seal for preventing the leakage of the magnetic liquid is provided at the lower open end of the rotating sleeve 57. 71 is a permanent magnet for magnetic seal; and 72 is a case for housing the magnet 71, the case 72 being mounted on the rotating sleeve 57. The cylinder is set into a VTR set with a surface 73 as a reference surface. H indicates the head height from the reference surface 73.

Figure 14:
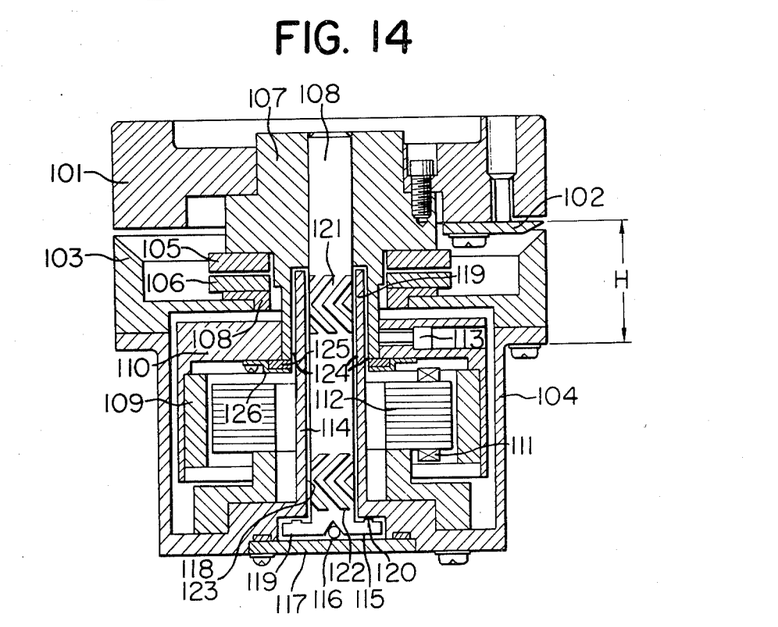

FIG. 14 shows a further embodiment of the present invention in a cylinder construction of the type in which a shaft is rotated. Numeral 101 is an upper cylinder; 102, a head mounted on the upper cylinder 101; 103, a lower cylinder securely joined to a lower housing 104 which is a base; 105 and 106, a rotating member and a stationary member of a rotary transformer; 107, a bushing securely joined to the rotating shaft 108, the upper cylinder 101 being removably mounted on the bushing 107.

The rotating member 105 of the rotating transformer is securely joined with adhesives to the bushing 107 while the stationary member 106 is securely joined with adhesives to a rotary transformer mounting ring 108 which in turn is mounted on the lower cylinder 103. Numeral 109 is a rotor magnet of a motor; 110 is a magnet case; 111, an armature coil of the motor; 112, a stator of the motor. The rotor magnet 109 is mounted inside of the case 110 which in turn is securely joined to the bushing 107 with bolts 113. Numerals 110, 109, 107, 101 and 105 constitute a major rotating member of the equipment in accordance with the present invention. Numeral 114 is a stationary sleeve fabricated integral with the lower housing 104; 115, a flange of a thrust bearing; 116, a pivot bearing; 117, a lower housing cap; 118, an oil film of a hydraulic bearing; 119, a herringbone bearing; 120, a step bearing (detail is not shown). A spiral-groove bearing is formed between the stationary sleeve 114 and the rotating shaft 108.

Numerals 121 and 122 are upper and lower spiral groove groups. Numeral 123 is a magnetic liquid used as a lubricant and completely filled to the opening 124 of the stationary sleeve which corresponds to the upper ends of the rotating shaft 108, the flange 115 of the thrust bearing and the stationary sleeve 114. A magnetic seal is provided for preventing the leakage of the magnetic liquid 123 is provided at the opening 124 of the bushing 107. Numeral 125 is a permanent magnet for magnetic sealing, and 126 is a magnet case.

In the cylinder construction of the present invention in which the hydraulic bearings are used, the rotating shaft 108 which is rotatably fitted into the stationary sleeve 114 with the upper opening in such a way that the film of the lubricant is formed between them, is spun by the DD (direct-drive) motor.

What is claimed is:

1. A rotary device comprising:
   a shaft having at least one free end;
   a housing engaged through a lubricating fluid with said shaft for rotation relative thereto;
   a projection, which extends from a surface of said free end of said shaft or the surface of said housing in opposed relationship with said free end of said shaft, to carry the axial load when the device is not rotating;
   a first dynamic thrust bearing which acts in such a way that the free end of said shaft and the surface of said housing, in opposed relationship with said free end of said shaft are forced to be separated in the axial direction when the device is rotated; and
   a second dynamic thrust bearing which acts to produce a force which conteracts the axially acting force produced by said first dynamic thrust bearing, said second dynamic thrust bearing being formed in a relatively moving surface different from said surface with said projection and said surface in opposed relation thereto, said second dynamic thrust bearing having a greater change in load carrying capacity with displacement in the axial direction, than said first dynamic thrust bearing, at the point at which said first and second dynamic thrust bearings are in equilibrium.

2. A rotary device as set forth in claim 1 wherein said first dynamic thrust bearing comprises a herringbone bearing.

3. A rotary device as set forth in claim 1 wherein said second dynamic thrust bearing comprises a step hydraulic bearing.

4. A rotary device as set forth in claim 1 wherein said shaft is formed with a flange with a large diameter adjacent to said free end thereof, and said first and second dynamic thrust bearings are formed in the surfaces, respectively, of said flange.

* * * * *

UNITED STATES PATENT OFFICE
CERTIFICATE OF CORRECTION

Patent No. 4,346,946              Dated    August 31, 1982

Inventor(s)   Teruo Maruyama

It is certified that error appears in the above-identified patent and that said Letters Patent are hereby corrected as shown below:

Column 1, line 8:   "trouble" should be --Trouble--
          line 22:  delete "so that these can accrue"
          line 23:  delete "of"
          line 57:  "interval" should be --intervals--
          line 67:  delete "prior art" and insert it after "a" (second occurence) this should then read --a prior art bearing--

Column 2, line 58:  after "tolerance" insert --$\delta$--
Column 3, line 21:  after "2", change the period to a comma; change "there" to --these--
          line 23:  after "rotation", change the comma to a period; change "in" to --In--
          line 47:  change "1" to --$\ell$--
          line 54:  delete "in the"
          line 63:  before "at", insert --produced--

Column 6, line 59:  change "for" to --or--
Column 7, line 45:  change "1" to --$\ell$--

UNITED STATES PATENT OFFICE
CERTIFICATE OF CORRECTION

Patent No. 4,346,946      Dated August 31, 1982

Inventor(s) Teruo Maruyama

It is certified that error appears in the above-identified patent and that said Letters Patent are hereby corrected as shown below:

Column 7, line 58: (two occurences) change "1" to --$\ell$--

Column 8, lines 3 and 4: "postulate" should be --particulate--
        line 4: delete the comma
        line 33: "easeness" should be --ease--

Column 10, line 14: after "In", insert --the--
Column 11, line 38: "filled to" should be --fills--

Signed and Sealed this

Thirty-first Day of January 1984

[SEAL]

Attest:

GERALD J. MOSSINGHOFF

*Attesting Officer*      *Commissioner of Patents and Trademarks*